United States Patent
Hsu

(10) Patent No.: US 9,570,225 B2
(45) Date of Patent: Feb. 14, 2017

(54) MAGNETOELECTRIC DEVICE CAPABLE OF STORING USABLE ELECTRICAL ENERGY

(71) Applicants: Fu-Tzu Hsu, Taipei (TW); Chieh-Sen Tu, New Taipei (TW)

(72) Inventor: Fu-Tzu Hsu, Taipei (TW)

(73) Assignee: Chieh-Sen Tu, New Taipei (TW)

( * ) Notice: Subject to any disclaimer, the term of this patent is extended or adjusted under 35 U.S.C. 154(b) by 255 days.

(21) Appl. No.: 14/227,567

(22) Filed: Mar. 27, 2014

(65) Prior Publication Data
US 2015/0280552 A1   Oct. 1, 2015

(51) Int. Cl.
| | |
|---|---|
| H03B 5/08 | (2006.01) |
| H01F 27/24 | (2006.01) |
| H01F 27/00 | (2006.01) |
| H01F 27/34 | (2006.01) |
| H02M 3/155 | (2006.01) |
| H02K 53/00 | (2006.01) |
| H02M 3/10 | (2006.01) |
| H02K 19/10 | (2006.01) |
| H02K 1/24 | (2006.01) |
| H05B 41/28 | (2006.01) |

(52) U.S. Cl.
CPC .............. *H01F 27/24* (2013.01); *H01F 27/00* (2013.01); *H01F 27/34* (2013.01); *H02M 3/155* (2013.01); *H02K 1/246* (2013.01); *H02K 19/103* (2013.01); *H02K 53/00* (2013.01); *H02M 3/10* (2013.01); *H02M 2003/1555* (2013.01); *H05B 41/28* (2013.01); *Y10S 74/09* (2013.01)

(58) Field of Classification Search
CPC ...... H05B 41/28; H02K 19/103; H02K 1/246; H02K 53/00; H02P 25/085; H02M 3/10; H01F 2027/348; H01F 27/34; H01F 27/00
USPC ...... 323/247, 248, 250, 249; 315/411, 241 P, 315/200 A; 331/167
See application file for complete search history.

(56) References Cited

U.S. PATENT DOCUMENTS

| | | | | |
|---|---|---|---|---|
| 4,308,495 A | * | 12/1981 | Yasumura | G05F 1/325 323/250 |
| 4,339,792 A | * | 7/1982 | Yasumura | G05F 1/325 323/248 |

* cited by examiner

*Primary Examiner* — Arnold Kinkead
(74) *Attorney, Agent, or Firm* — McNees Wallace & Nurick LLC

(57) ABSTRACT

A magnetoelectric device includes at least one reluctance component, at least one damping capacitor, and a switching circuit. The reluctance component includes a capacitive and inductive magnetic core unit having a loop-shaped first segment and a second segment connected to the first segment, and at least one coil wound around and loosely coupled to the magnetic core unit. The damping capacitor cooperates with the coil to form a resonant circuit. The switching circuit makes and breaks electrical connection between the coil and a DC power source so that an eddy current flowing through the resonant circuit may be generated for storing energy in the damping capacitor.

14 Claims, 17 Drawing Sheets

MAGNETOELECTRIC DEVICE CAPABLE OF STORING USABLE ELECTRICAL ENERGY

BACKGROUND OF THE INVENTION

1. Field of the Invention

The invention relates to an electric device, and more particularly to a magnetoelectric device.

2. Description of the Related Art

FIG. 1 shows a conventional transformer 1 including an E-shaped magnetic core and an I-shaped magnetic core. A primary coil 11 and a secondary coil 12 are wound around and tightly coupled to the E-shaped magnetic core. In general, the conventional magnetic core is made of a single material, such that there must be an air gap between the magnetic cores for preventing magnetic saturation, resulting in negative magnetic damping effect and limiting output electrical energy. In addition, the counter-electromotive force at the output terminal OUT may directly impact the input terminal, resulting in great loss of eddy current. As a result, even if the conventional transformer 1 has high conversion efficiency, it can only be used for transmission or transfer of electrical energy.

SUMMARY OF THE INVENTION

Therefore, an object of the present invention is to provide a magnetoelectric device that has positive magnetic damping effect and that may store usable electrical energy.

According to the present invention, a magnetoelectric device comprises:

at least one reluctance component that includes a magnetic core unit and at least one coil, the magnetic core unit having a loop-shaped first segment and a second segment connected to the first segment, and being made of a magnetic core material such that the magnetic core unit is both capacitive and inductive, the at least one coil being wound around and loosely coupled to the magnetic core unit;

at least one damping capacitor coupled to and cooperating with the at least one coil to forma resonant circuit; and a switching circuit disposed to couple the at least one coil to a direct-current (DC) power source, and operable to make electrical connection between the at least one coil and the DC power source for exciting the at least one coil such that the magnetic core unit reaches magnetic saturation, and to subsequently break electrical connection between the at least one coil and the DC power source so as to generate an eddy current flowing through the resonant circuit for storing energy in the damping capacitor.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

The magnetoelectric device according to the present invention promotes usable electrical energy by switching control of current flow through a reluctance component that has positive magnetic damping effect. The reluctance component used in this invention includes a magnetic core unit and at least one coil. The magnetic core unit has a loop-shaped first segment and a second segment connected to the first segment, and is made of at least one magnetic core material such that the magnetic core unit is both capacitive and inductive. Said at least one coil is wound around and loosely coupled to the magnetic core unit.

Figure 1:
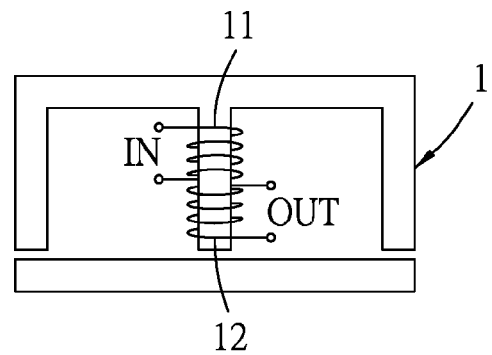
FIG. 1 is a schematic diagram showing a conventional transformer.
Figure 2:
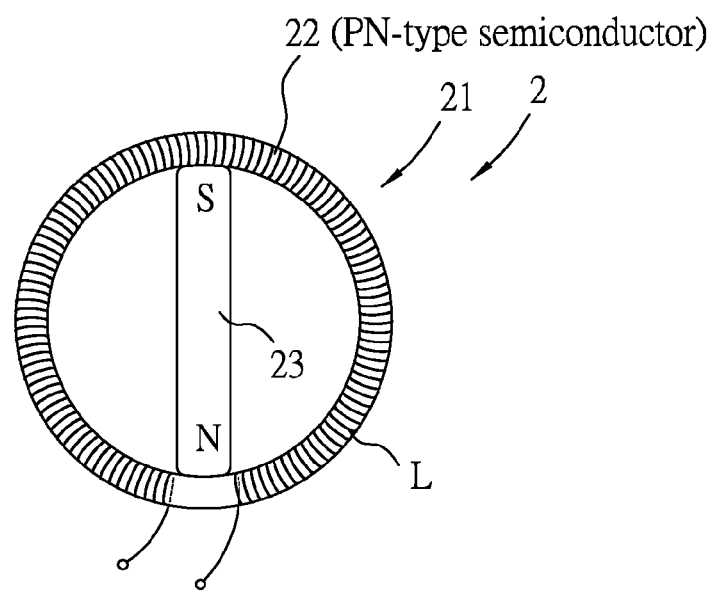
FIG. 2 is a schematic diagram showing a reluctance component of a first preferred embodiment of the magnetoelectric device according to the present invention.

FIG. 2 shows a reluctance component 2 of a first preferred embodiment of the magnetoelectric device. The first segment of the magnetic core unit 21 is a PN-type semiconductor magnetic core 22 that is both capacitive and inductive (e.g., a solid state inductor), and the second segment of the magnetic core unit 21 is a permanent magnet 23 surrounded by the magnetic core 22 and having opposite ends respectively adjacent to oppositely disposed parts of the magnetic core 22. The coil L is wound around the magnetic core 22. Since the coil L is loosely coupled to the magnetic core 22, since there is no air gap between the magnetic core 22 and the permanent magnet 23, and since the permanent magnet 23 has negative impedance (negative inductance) effect, the magnetic core unit 21 rapidly reaches magnetic saturation when the coil L is excited with current to generate a magnetic field that magnetizes the magnetic core unit 21, and when provision of the current to the coil L is subsequently stopped, the magnetic core unit 21 releases magnetic energy as a result of positive magnetic damping effect (i.e., magnetic shunt), and generates an eddy current that flows to the coil L, and the electrical energy outputted by the coil L is increased as a consequence.

Figure 3:
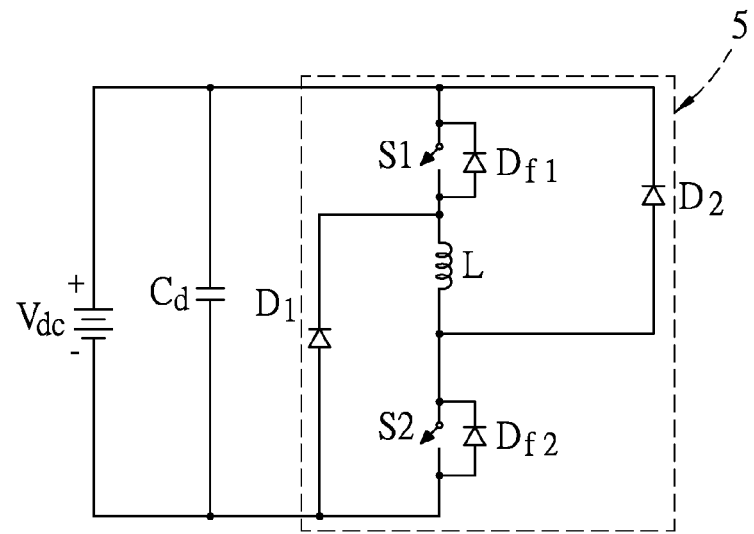
FIG. 3 is a schematic circuit diagram illustrating the first preferred embodiment of the magnetoelectric device according to the present invention.

Referring to FIG. 3, the first preferred embodiment of the magnetoelectric device according to the present invention receives input of a direct-current (DC) power source $V_{dc}$ (e.g., a rechargeable battery), and includes the reluctance component 2 (see FIG. 2), a damping capacitor $C_d$ coupled to the DC power source $V_{dc}$ in parallel, and a switching circuit 5. The switching circuit 5 includes a first switch S1 coupled between a terminal of the coil L and a positive terminal of the DC power source $V_{dc}$, a second switch S2 coupled between another terminal of the coil L and a negative terminal of the DC power source $V_{dc}$, a first diode $D_1$ having a cathode coupled to the terminal of the coil L, and an anode coupled to the negative terminal of the DC power source $V_{dc}$, a second diode $D_2$ having an anode coupled to said another terminal of the coil L, and a cathode coupled to the positive terminal of the DC power source $V_{dc}$, a first freewheeling diode $D_{f1}$ coupled to the first switch S1 in parallel and having a cathode coupled to the positive terminal of the DC power source $V_{dc}$, and a second freewheeling diode $D_{f2}$ coupled to the second switch S2 in parallel and having an anode coupled to the negative terminal of the DC power source $V_{dc}$.

It should be noted that a switch controller (not shown) may be included in the switching circuit 5 to control the switches throughout all of the preferred embodiments of the magnetoelectric device according to this invention. However, the switches maybe controlled externally in other embodiments.

Figure 4:
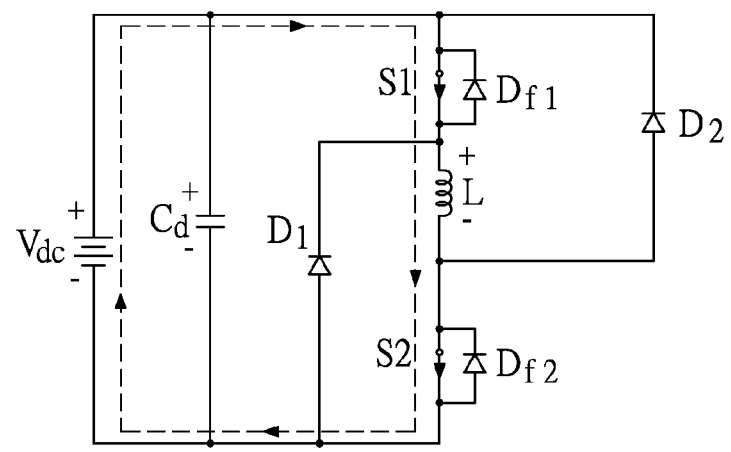
FIGS. 4 and 5 are schematic circuit diagrams illustrating operation of the first preferred embodiment of the magnetoelectric device.
Figure 5:
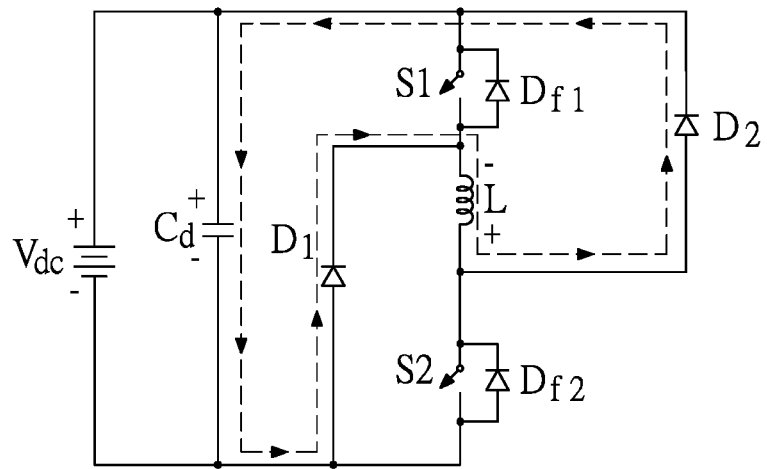

Referring to FIG. 4, when the first and second switches S1, S2 are closed (i.e., make electrical connections) simultaneously, the DC power source $V_{dc}$ is coupled to the coil L through the switches S1, S2, current outputted by the DC power source $V_{dc}$ flows through and excites the coil L, and a magnetic field is thus generated to magnetize the magnetic core unit 21, such that the magnetic core unit 21 reaches magnetic saturation rapidly and becomes a magnet instantly. Then, as shown in FIG. 5, the switches S1, S2 are switched to be open (i.e., break electrical connections) simultaneously such that the coil L is coupled to the damping capacitor $C_d$ through the diodes $D_1$, $D_2$. At this time, in addition to current generated by the coil L due to counter-electromotive force, the magnetic core unit 21 is demagnetized in a very short time due to magnetic shunt, and generates an eddy current coupled to the coil L, such that the coil L outputs a current (including the eddy current and the current generated due to counter-electromotive force) that charges the damping capacitor $C_d$.

Therefore, by repeated control of the switches S1, S2 to take turns in making electrical connections simultaneously and breaking electrical connections simultaneously, the damping capacitor $C_d$ eventually charges the DC power source $V_{dc}$ when a voltage across the damping capacitor $C_d$ is higher than that of the DC power source $V_{dc}$, promoting usable electrical energy stored in the DC power source $V_{dc}$. In this embodiment, the switches S1, S2 are controlled using a control signal with a constant frequency of about 10 KHz and an amplitude of about 12V, but the present invention should not be limited in this respect. In addition, a time point at which the magnetic core unit 21 reaches magnetic saturation maybe controlled by adjustment of a duty cycle of the control signal, such that the eddy current may be maximized.

Figure 6:
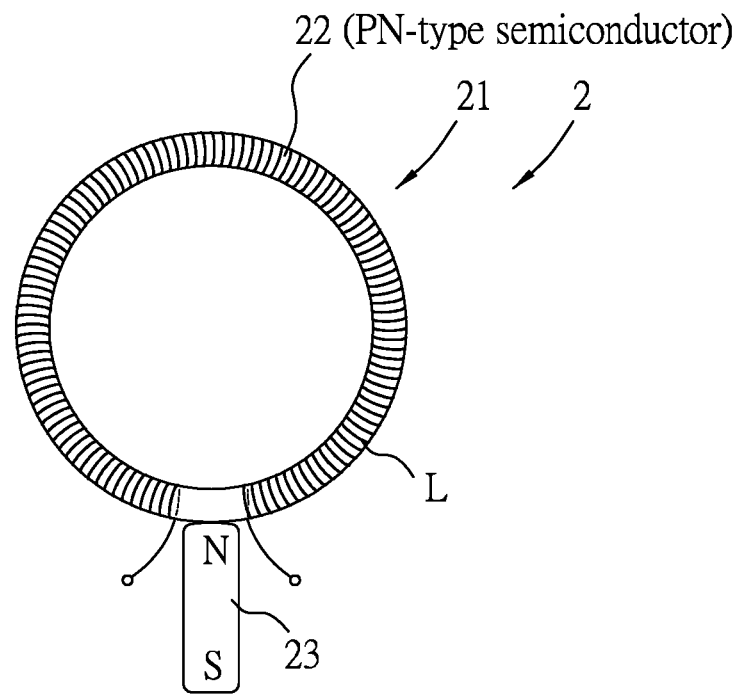
FIG. 6 is a schematic diagram showing a modification of the reluctance component of the first preferred embodiment.

In a modification, in this embodiment, the magnetic core unit 21 may be configured such that the permanent magnet 23 has one end adjacent to an outer periphery of the magnetic core 22, as shown in FIG. 6, instead of the configuration as shown in FIG. 2. In such a configuration, the magnetic core unit 21 can also reach magnetic saturation rapidly when the coil L is excited.

Figure 7:
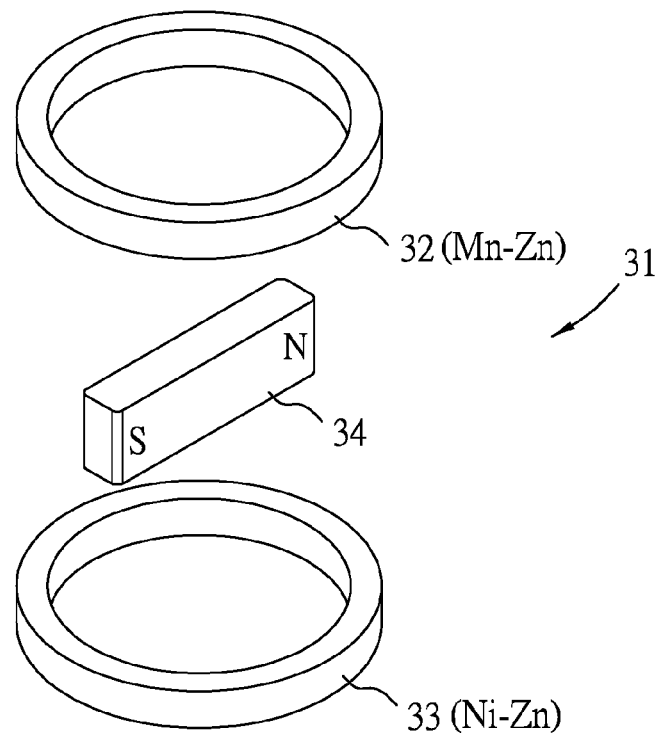
FIG. 7 is an exploded schematic diagram of a magnetic core unit of a reluctance component of a second preferred embodiment of the magnetoelectric device according to the present invention.
Figure 8:
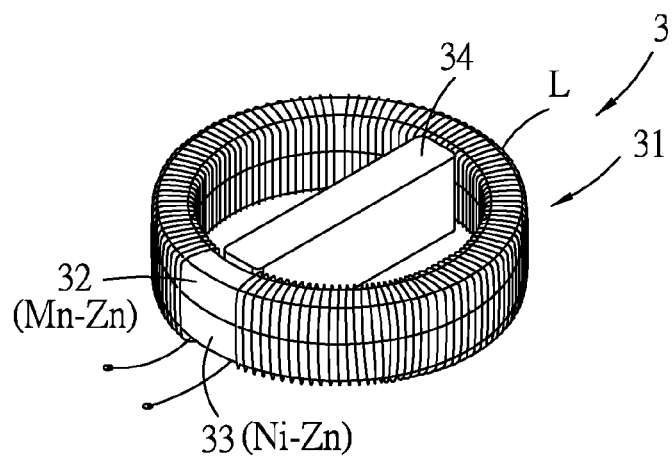
FIG. 8 is a perspective view of the reluctance component of the second preferred embodiment.

FIGS. 7 and 8 show a magnetic core unit 31 and a coil L of the reluctance component 3 of a second preferred embodiment of the magnetoelectric device. The magnetic core unit 31 includes a loop-shaped inductive Mn—Zn magnetic core 32 and a loop-shaped capacitive Ni—Zn magnetic core 33 that are arranged in a stack to serve as the first segment of the magnetic core unit 31. The second segment of the magnetic core unit 31 is a permanent magnet 34 surrounded by the first segment of the magnetic core unit 31 and having opposite ends respectively adjacent to oppositely disposed parts of the first segment. The coil L is wound around the first segment of the magnetic core unit 31. Since the coil L is loosely coupled to the magnetic core unit 31, since there is no air gap between the first segment of the magnetic core unit 31 and the permanent magnet 34, and since the permanent magnet 34 has negative impedance (negative inductance) effect, the magnetic core unit 31 rapidly reaches magnetic saturation when the coil L is excited with current to generate a magnetic field that magnetizes the magnetic core unit 31, and when provision of the current to the coil L is subsequently stopped, the magnetic core unit 31 releases magnetic energy as a result of magnetic shunt, and generates an eddy current that flows to the coil L, and the electrical energy outputted by the coil L is increased as a consequence.

Figure 9:
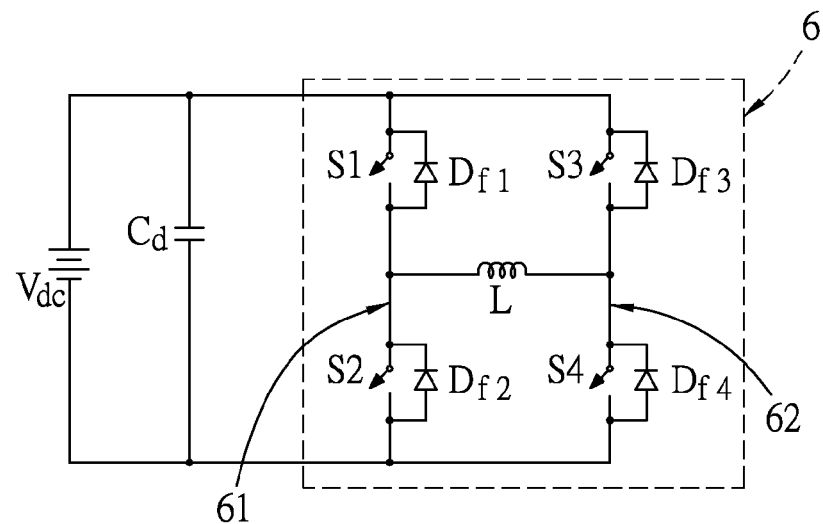
FIG. 9 is a schematic circuit diagram illustrating the second preferred embodiment of the magnetoelectric device according to the present invention.

Referring to FIG. 9, the second preferred embodiment of the magnetoelectric device according to the present invention receives input of a DC power source $V_{dc}$ (e.g., a rechargeable battery), and includes the reluctance component 3 (see FIG. 8), a damping capacitor $C_d$ coupled to the DC power source $V_{dc}$ in parallel, and a switching circuit 6. The switching circuit 6 includes two bridge arms 61, 62. Each of the bridge arms 61, 62 is coupled to the DC power source $V_{dc}$ in parallel, and includes a first switch S1/S3, a second switch S2/S4, a first freewheeling diode $D_{f1}/D_{f3}$, and a second freewheeling diode $D_{f2}/D_{f4}$. The first switch S1/S3 has a terminal coupled to a positive terminal of the DC power source $V_{dc}$. The second switch S2/S4 is coupled between another terminal of the first switch S1/S3 and a negative terminal of the DC power source $V_{dc}$. The first freewheeling diode $D_{f1}/D_{f3}$ is coupled to the first switch S1/S3 in parallel, and has a cathode coupled to the positive terminal of the DC power source $V_{dc}$. The second freewheeling diode $D_{f2}/D_{f4}$ is coupled to the second switch S2/S4 in parallel, and has an anode coupled to the negative terminal of the DC power source $V_{dc}$. The coil L is coupled between common nodes of the first switch S1/S3 and the second switch S2/S4 of the two bridge arms 61, 62.

Figure 10:
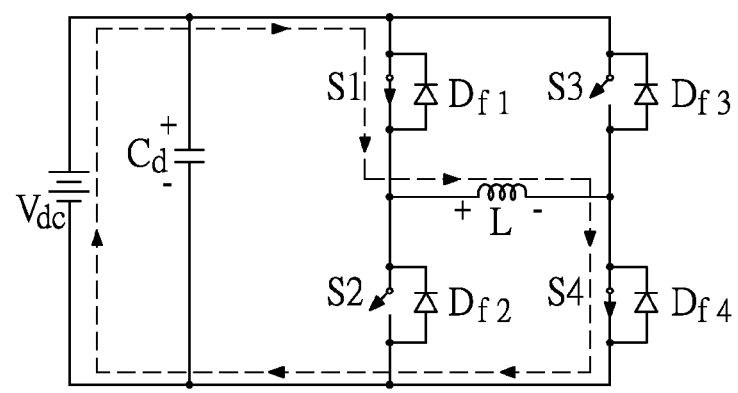
FIGS. 10 to 13 are schematic circuit diagrams illustrating operation of the second preferred embodiment of the magnetoelectric device.
Figure 11:
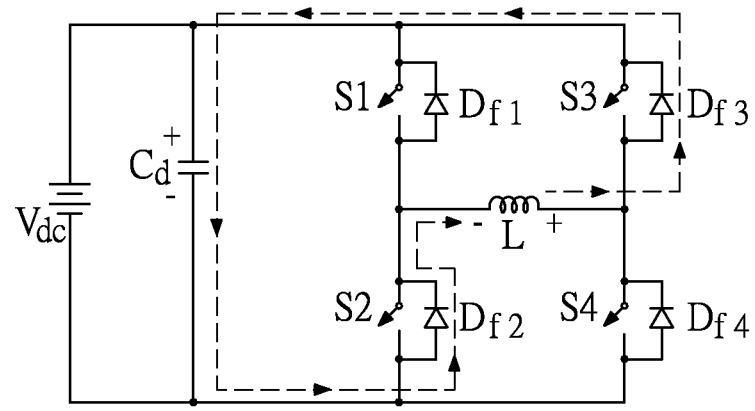

Referring to FIG. 10, when the switches S1, S4 are closed, and the switches S2, S3 are open, the DC power source $V_{dc}$ is coupled to the coil L through the switches S1, S4, current outputted by the DC power source $V_{dc}$ flows through and excites the coil L, and a magnetic field is thus generated to magnetize the magnetic core unit 31, such that the magnetic core unit 31 reaches magnetic saturation rapidly and becomes a magnet instantly. Then, as shown in FIG. 11, the switches S1, S4 are switched to be open such that the coil L is coupled to the damping capacitor $C_d$ through the freewheeling diodes $D_{f2}$, $D_{f3}$. At this time, in addition to current generated by the coil L due to counter-electromotive force, the magnetic core unit 31 is demagnetized in a very short time due to magnetic shunt, and generates an eddy current coupled to the coil L, such that the coil L outputs a current (including the eddy current and the current generated due to counter-electromotive force) that charges the damping capacitor $C_d$.

Figure 12:
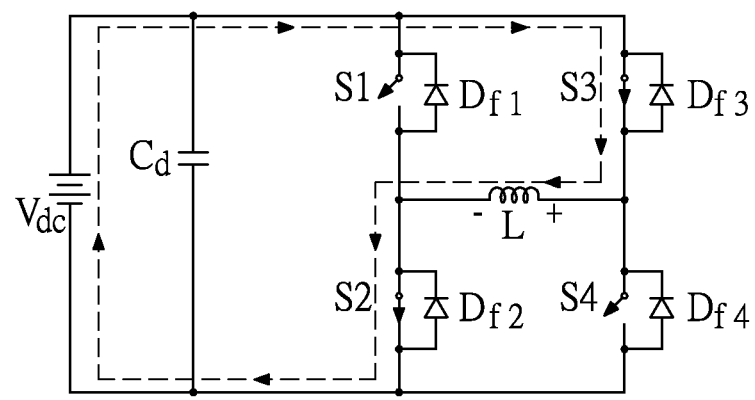
Figure 13:
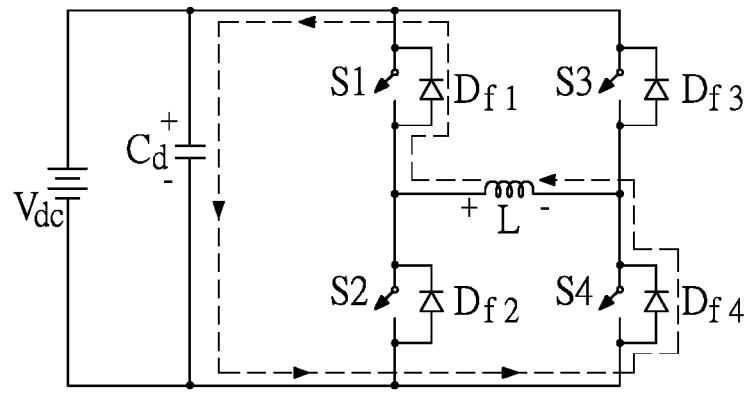

Similarly, referring to FIG. 12, when the switches S2, S3 are closed, and the switches S1, S4 are open, the DC power source $V_{dc}$ is coupled to the coil L through the switches S2, S3, current outputted by the DC power source $V_{dc}$ flows through and excites the coil L, and a magnetic field is thus generated to magnetize the magnetic core unit 31, such that the magnetic core unit 31 reaches magnetic saturation rapidly and becomes a magnet instantly. Then, as shown in FIG. 13, the switches S2, S3 are switched to be open such that the coil L is coupled to the damping capacitor $C_d$ through the freewheeling diodes $D_{f1}$, $D_{f4}$. At this time, in addition to current generated by the coil L due to counter-electromotive force, the magnetic core unit 31 is demagnetized in a very short time due to magnetic shunt, and generates an eddy current coupled to the coil L, such that the coil L outputs a current (including the eddy current and the current generated due to counter-electromotive force) that charges the damping capacitor $C_d$.

Therefore, when a control signal is provided such that the switches S1, S4 and the switches S2, S3 take turns in making electrical connections, the magnetic core unit 31 keeps on generating the eddy current coupled to the coil L due to repeatedly being magnetized and demagnetized, and charging the damping capacitor $C_d$, such that the damping capacitor $C_d$ eventually charges the DC power source $V_{dc}$ when a voltage across the damping capacitor $C_d$ is higher than that of the DC power source $V_{dc}$, promoting usable electrical energy stored in the DC power source $V_{dc}$. In this embodiment, the control signal has a constant frequency of about 10 KHz and an amplitude of about 12V, but the present invention should not be limited in this respect. In addition, a time point at which the magnetic core unit 31 reaches magnetic saturation may be controlled by adjustment of a duty cycle of the control signal, such that the eddy current may be maximized.

Figure 14:
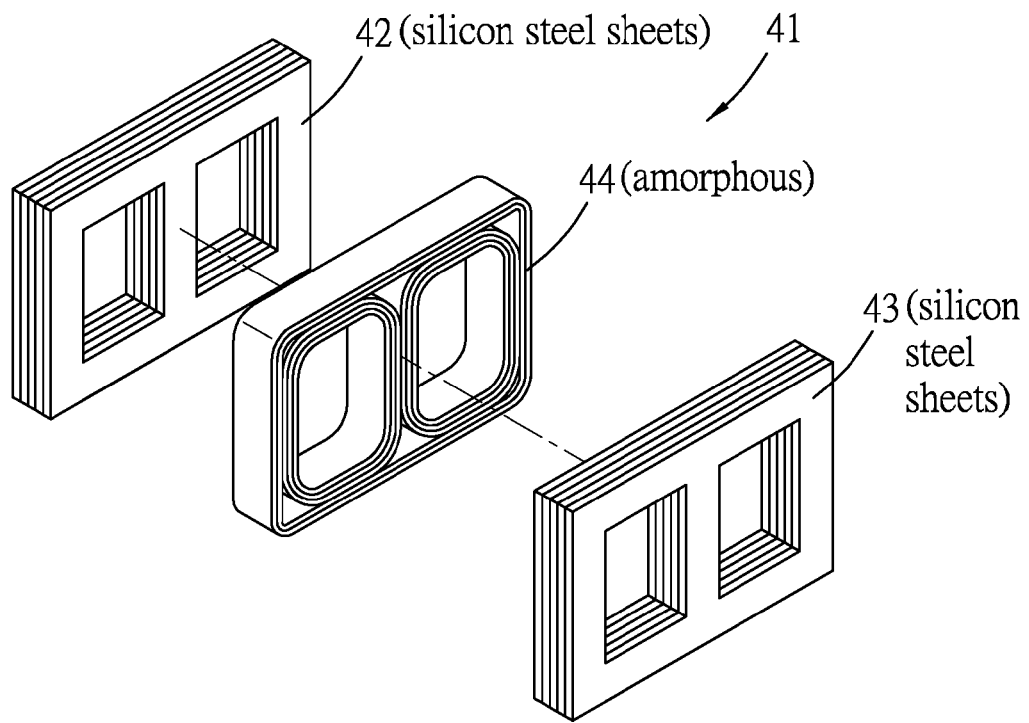
FIG. 14 is an exploded schematic diagram of a magnetic core unit of a reluctance component of a third preferred embodiment of the magnetoelectric device according to the present invention.
Figure 15:
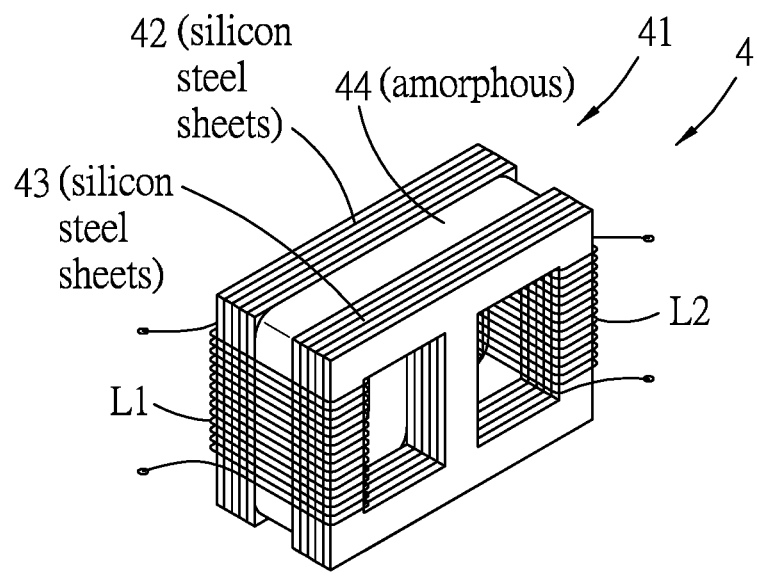
FIG. 15 is a perspective view of the reluctance component of the third preferred embodiment.
Figure 16:
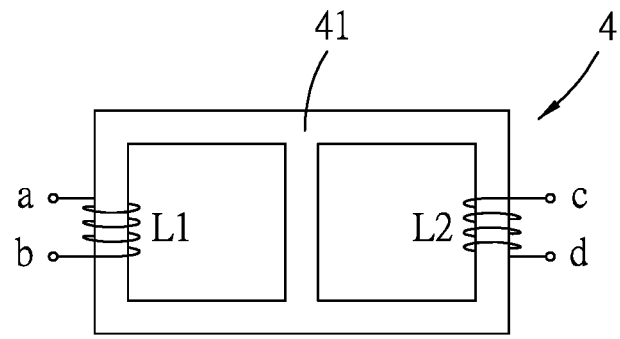
FIG. 16 is a schematic diagram illustrating the reluctance component of the third preferred embodiment.

FIGS. 14 to 16 show a magnetic core unit 41, a first coil L1 and a second coil L2 of a reluctance component 4 of a third preferred embodiment of the magnetoelectric device. In this embodiment, the second segment of the magnetic core unit 41 is surrounded by the first segment of the magnetic core unit 41 and extends between oppositely disposed parts of the first segment. The magnetic core unit 41 includes a first set of silicon steel sheets 42, a second set of silicon steel sheets 43, and an inductive amorphous magnetic core 44 sandwiched between the first set and the second set of silicon steel sheets 42, 43. The first coil L1 and the second coil L2 are respectively wound around and loosely coupled to first and second sections of the first segment of the magnetic core unit 41 that are disposed on opposite sides of the second segment of the magnetic core unit 41. Since the coils L1 and L2 are loosely coupled to the magnetic core unit 41, and since there is no air gap among the first set of silicon steel sheets 42, the second set of silicon steel sheets 43 and the amorphous magnetic core 44, the magnetic core unit 41 rapidly reaches magnetic saturation when the first coil L1 is excited with current to generate a magnetic field that magnetizes the magnetic core unit 41, and when provision of the current to the first coil L1 is subsequently stopped, the magnetic core unit 41 is demagnetized in a very short time, resulting in positive magnetic damping effect (magnetic shunt), and generates an eddy current that flows to the second coil L2 as a result of release of magnetic energy, such that the electrical energy outputted by the second coil L2 is increased as a consequence.

Figure 17:
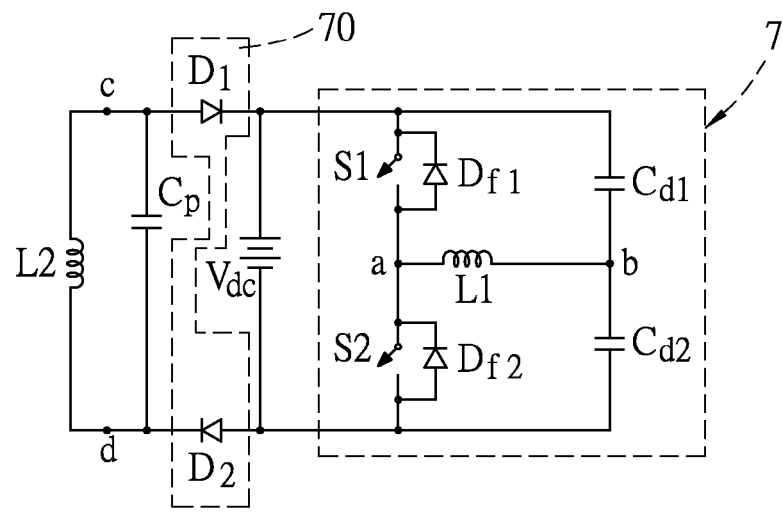
FIG. 17 is a schematic circuit diagram illustrating the third preferred embodiment of the magnetoelectric device according to the present invention.

Referring to FIG. 17, the third preferred embodiment of the magnetoelectric device according to the present invention receives input of a DC power source $V_{dc}$ (e.g., a rechargeable battery), and includes the reluctance component 4 (see FIGS. 15 and 16), a damping capacitor $C_p$ coupled to the second coil L2 in parallel, and a switching circuit 7. The switching circuit 7 includes a first damping capacitor $C_{d1}$ having a terminal coupled to a positive terminal of the DC power source $V_{dc}$, a second damping capacitor $C_{d2}$ coupled between another terminal of the first damping capacitor $C_{d1}$ and a negative terminal of the DC power source $V_{dc}$, a first switch S1 having a terminal coupled to the positive terminal of the DC power source $V_{dc}$, a second switch S2 coupled between another terminal of the first switch S1 and the negative terminal of the DC power source $V_{dc}$, a first freewheeling diode $D_{f1}$ coupled to the first switch S1 in parallel and having a cathode that is coupled to the positive terminal of the DC power source $V_{dc}$, a second freewheeling diode $D_{f2}$ coupled to the second switch S2 in parallel and having an anode that is coupled to the negative terminal of the DC power source $V_{dc}$, and a half-wave rectifier unit 70 coupling the damping capacitor $C_p$ to the positive and negative terminals of the DC power source $V_{dc}$ and including diodes D1, D2. The first coil L1 is coupled between a common node (a) of the first switch S1 and the second switch S2, and a common node (b) of the first damping capacitor $C_{d1}$ and the second damping capacitor $C_{d2}$.

Figure 18:
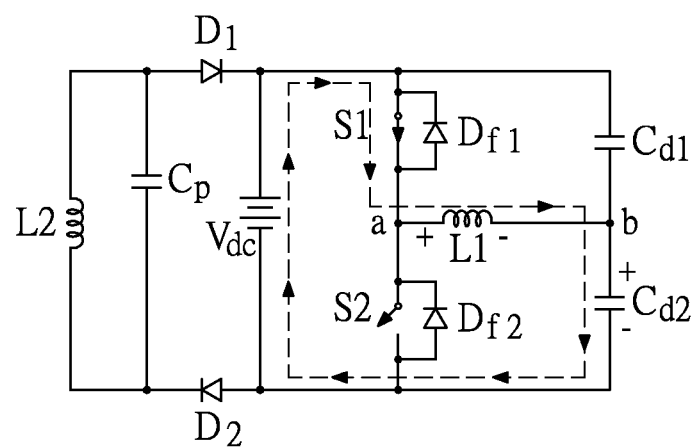
FIGS. 18 to 21 are schematic circuit diagrams illustrating operation of the third preferred embodiment of the magnetoelectric device.
Figure 19:
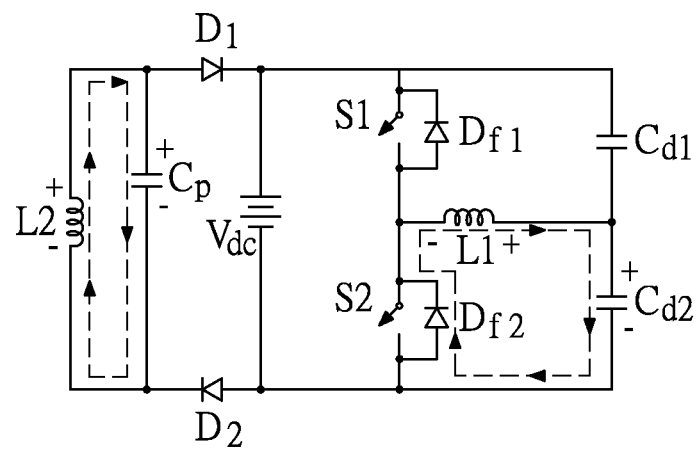

Referring to FIG. 18, when the first switch S1 is closed and the second switch S2 is open, the DC power source $V_{dc}$ is coupled to the first coil L1 through the first switch S1 and the second damping capacitor $C_{d2}$, current outputted by the DC power source $V_{dc}$ flows through and excites the first coil L1, and charges the second damping capacitor $C_{d2}$, and a magnetic field is thus generated by the first coil L1 to magnetize the magnetic core unit 41, such that the magnetic core unit 41 reaches magnetic saturation rapidly. Then, as shown in FIG. 19, the first switch S1 is switched to be open such that current generated by the first coil L1 due to counter-electromotive force charges the second damping capacitor $C_{d2}$ through the second freewheeling diode $D_{f2}$, and an eddy current generated by the magnetic core unit 41 due to magnetic shunt is coupled to the second coil L2 and charges the damping capacitor $C_p$.

Figure 20:
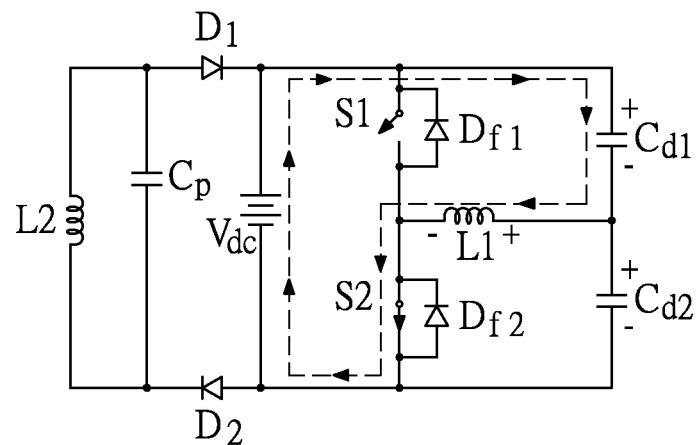
Figure 21:
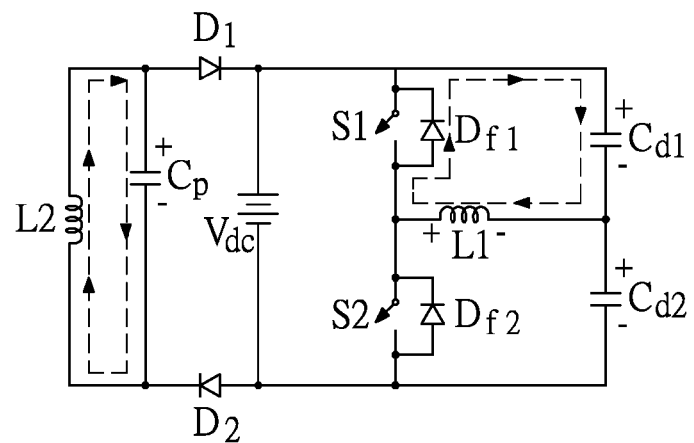

Similarly, referring to FIG. 20, when the second switch S2 is closed and the first switch S1 is open, the DC power source $V_{dc}$ is coupled to the first coil L1 through the second switch S2 and the first damping capacitor $C_{d1}$, current outputted by the DC power source $V_{dc}$ flows through and excites the first coil L1, and charges the first damping capacitor $C_{d1}$, and a magnetic field is thus generated by the first coil L1 to magnetize the magnetic core unit 41, such that the magnetic core unit 41 reaches magnetic saturation rapidly and becomes a magnet instantly. Then, as shown in FIG. 21, the second switch S2 is switched to be open such that current generated by the first coil L1 due to counter-electromotive force charges the first damping capacitor $C_{d1}$ through the first freewheeling diode $D_{f1}$, and an eddy current generated by the magnetic core unit 41 due to magnetic shunt is coupled to the second coil L2 and charges the damping capacitor $C_p$. In this embodiment, the first switch S1 and the second switch S2 do not make electrical connections at the same time.

Therefore, when a control signal is provided such that the switches S1, S2 take turns in making electrical connections, the magnetic core unit 41 keeps on generating the eddy current that is coupled to the second coil L2 due to repeatedly being magnetized and demagnetized, and charging the damping capacitor $C_p$ through the second coil L2. When a frequency of the control signal is adjusted such that the second coil L2 cooperates with the damping capacitor $C_p$ to be resonant, a half-wave resonance signal is generated on the damping capacitor $C_p$. The diodes $D_1$, $D_2$ of the half-wave rectifier unit 70 rectifies the half-wave resonance signal into a pulsating DC signal for charging the DC power source $V_{dc}$, thereby promoting usable electrical energy stored in the DC power source $V_{dc}$. At the same time, charging of the damping capacitors $C_{d1}$ and $C_{d2}$ continues. When a voltage across the damping capacitors $C_{d1}$ and $C_{d2}$ exceeds that of the DC power source $V_{dc}$, the damping capacitors $C_{d1}$ and $C_{d2}$ charge the DC power source $V_{dc}$, thereby promoting usable electrical energy stored in the DC power source $V_{dc}$.

Figure 22:
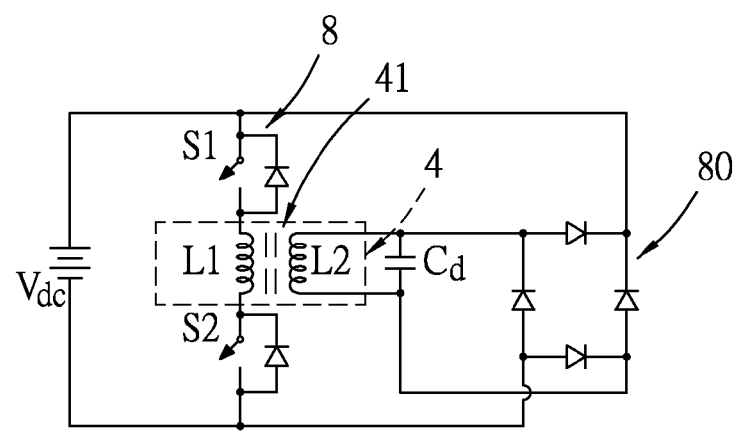
FIG. 22 is a schematic circuit diagram illustrating a fourth preferred embodiment of the magnetoelectric device according to the present invention.

Referring to FIG. 22, a fourth preferred embodiment of the magnetoelectric device according to the present invention receives input of a DC power source $V_{dc}$ (e.g., a rechargeable battery), and includes the reluctance component 4 (see FIGS. 15 and 16), a damping capacitor $C_d$ coupled to the second coil L2 in parallel, a switching circuit 8, and a full-wave rectifier circuit 80 coupling the damping capacitor $C_d$ to positive and negative terminals of the DC power source $V_{dc}$. The switching circuit 8 includes a first switch S1 coupled between an end of the first coil L1 and the positive terminal of the DC power source $V_{dc}$, and a second switch S2 coupled between another end of the first coil L1 and the negative terminal of the DC power source $V_{dc}$.

Figure 23:
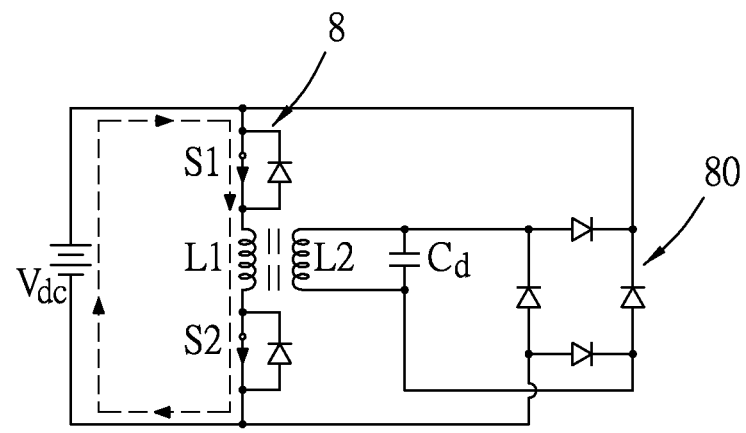
FIGS. 23 and 24 are schematic circuit diagrams illustrating operation of the fourth preferred embodiment of the magnetoelectric device.
Figure 24:
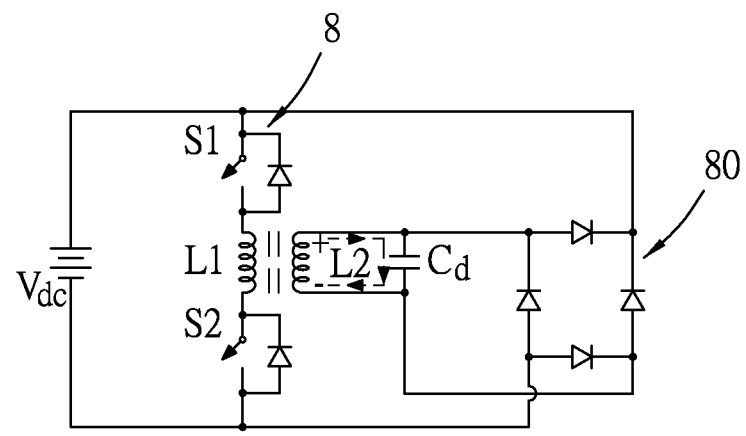

Referring to FIG. 23, when the first switch S1 and the second switch S2 are closed, the DC power source $V_{dc}$ is coupled to the first coil L1 through the first switch S1 and the second switch S2, current outputted by the DC power source $V_{dc}$ flows through and excites the first coil L1, and a magnetic field is thus generated by the first coil L1 to magnetize the magnetic core unit 41, such that the magnetic core unit 41 reaches magnetic saturation rapidly and becomes a magnet instantly. Then, as shown in FIG. 24, the first switch S1 and the second switch S2 are simultaneously switched to be open such that the magnetic core unit 41 is demagnetized in a very short time, and an eddy current generated by the magnetic core unit 41 due to magnetic shunt is coupled to the second coil L2 and charges the damping capacitor $C_d$.

Therefore, when a control signal is provided such that the switches S1, S2 repeatedly alternate between making electrical connections simultaneously and breaking electrical connections simultaneously, the magnetic core unit 41 keeps on generating the eddy current coupled to the second coil L2 due to repeatedly being magnetized and demagnetized, and charging the damping capacitor $C_d$ through the second coil L2. In this embodiment, the control signal has a constant frequency, and when amplitude of the control signal is adjusted such that the second coil L2 cooperates with the damping capacitor Cd to be resonant, a sine-wave resonance signal is generated on the damping capacitor $C_d$. The full-wave rectifier circuit 80 rectifies the sine-wave resonance signal into a pulsating DC signal for charging the DC power source $V_{dc}$, thereby promoting usable electrical energy stored in the DC power source $V_{dc}$.

Figure 25:
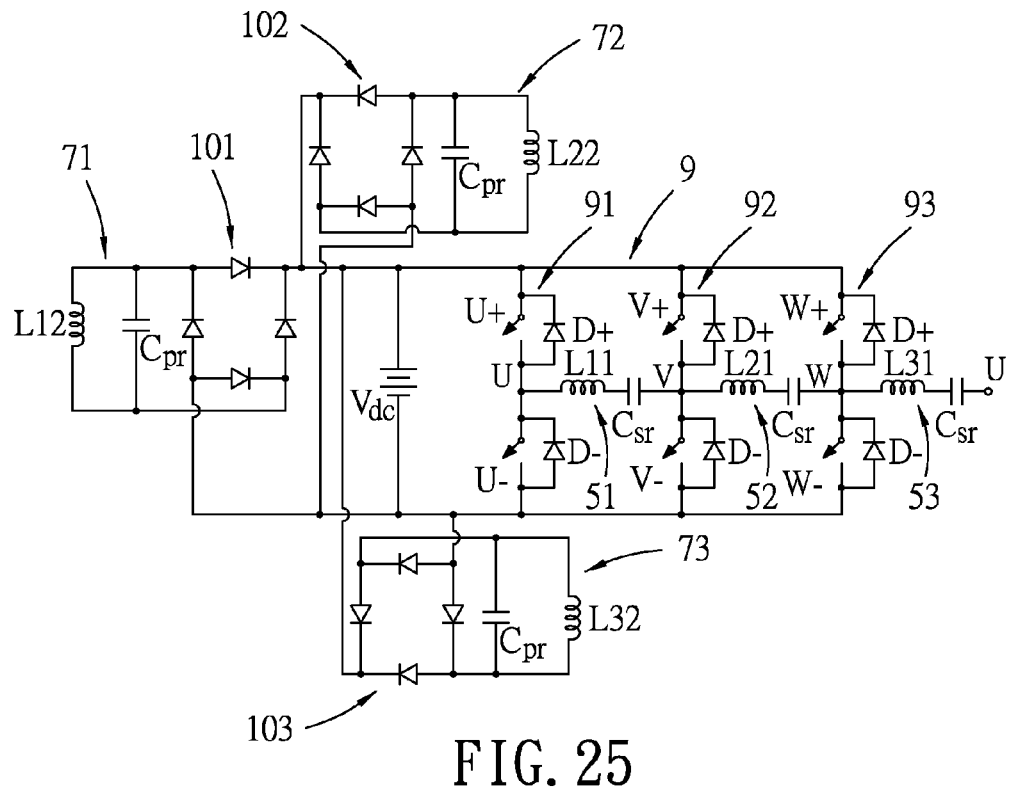
FIG. 25 is a schematic circuit diagram illustrating a fifth preferred embodiment of the magnetoelectric device according to the present invention.
Figure 26:
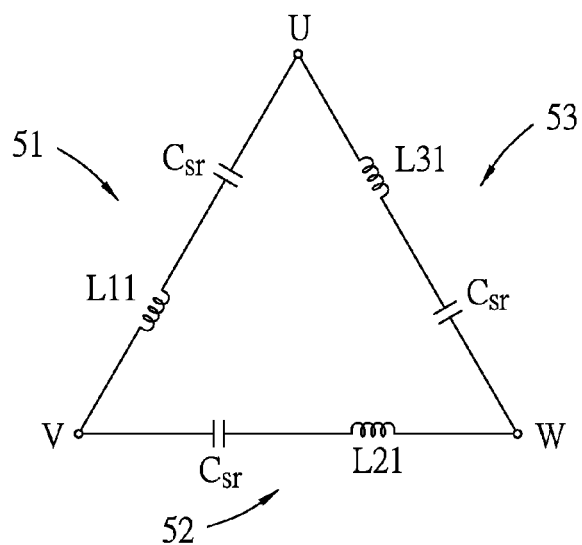
FIG. 26 is a schematic circuit diagram illustrating three delta-connected series resonant circuits of the fifth preferred embodiment of the magnetoelectric device.

Referring to FIG. 25, a fourth preferred embodiment of the magnetoelectric device according to the present invention receives input of a DC power source $V_{dc}$ (e.g., a rechargeable battery), and includes three reluctance components 4 (see FIGS. 15 and 16), three resonant capacitors $C_{sr}$ (also being damping capacitors), three damping capacitors $C_{pr}$, a switching circuit 9, and three full-wave rectifier circuits 101, 102, 103. Further referring to FIG. 26, the resonant capacitors Csr are respectively coupled to the first coils L11, L21, L31 of the reluctance components 4 in series to form three series resonant circuits 51, 52, 53 that are delta-connected with three connection nodes U, V, W. The damping capacitors $C_{pr}$ are respectively coupled to the second coils L12, L22, L32 of the reluctance components 4 in parallel to form three parallel resonant circuits 71, 72, 73. The full-wave rectifier circuits 101, 102, 103 couple a respective one of the parallel resonant circuits 71, 72, 73 to positive and negative terminals of the DC power source $V_{dc}$ for rectifying an alternating-current (AC) resonant signal from a respective one of the parallel resonant circuits 71, 72, 73 into a pulsating DC signal for charging the DC power source $V_{dc}$.

The switching circuit 9 includes three bridge arms 91, 92, 93. Each of the bridge arms 91, 92, 93 is coupled to the DC power source $V_{dc}$ in parallel, and includes a first switch U+/V+/W+ having a terminal coupled to the positive terminal of the DC power source $V_{dc}$, a second switch U−/V−/W− coupled between another terminal of the first switch U+/V+/W+ and the negative terminal of the DC power source $V_{dc}$, a first freewheeling diode D+ coupled to the first switch U+/V+/W+ in parallel, and having an anode coupled to said another terminal of the first switch U+/V+/W+, and a second freewheeling diode D− coupled to the second switch U−/V−/W− in parallel, and having a cathode coupled to said another terminal of the first switch U+/V+/W+. The series resonant circuit 51 is coupled between a common node of the first switch U+ and the second switch U− of the bridge arm 91, and a common node of the first switch V+ and the second switch V− of the bridge arm 92. The series resonant circuit 52 is coupled between the common node of the first switch V+ and the second switch V− of the bridge arm 92, and a common node of the first switch W+ and the second switch W− of the bridge arm 93. The series resonant circuit 53 is coupled between the common node of the first switch W+ and the second switch W− of the bridge arm 93, and the common node of the first switch U+ and the second switch U− of the bridge arm 91.

Figure 27:
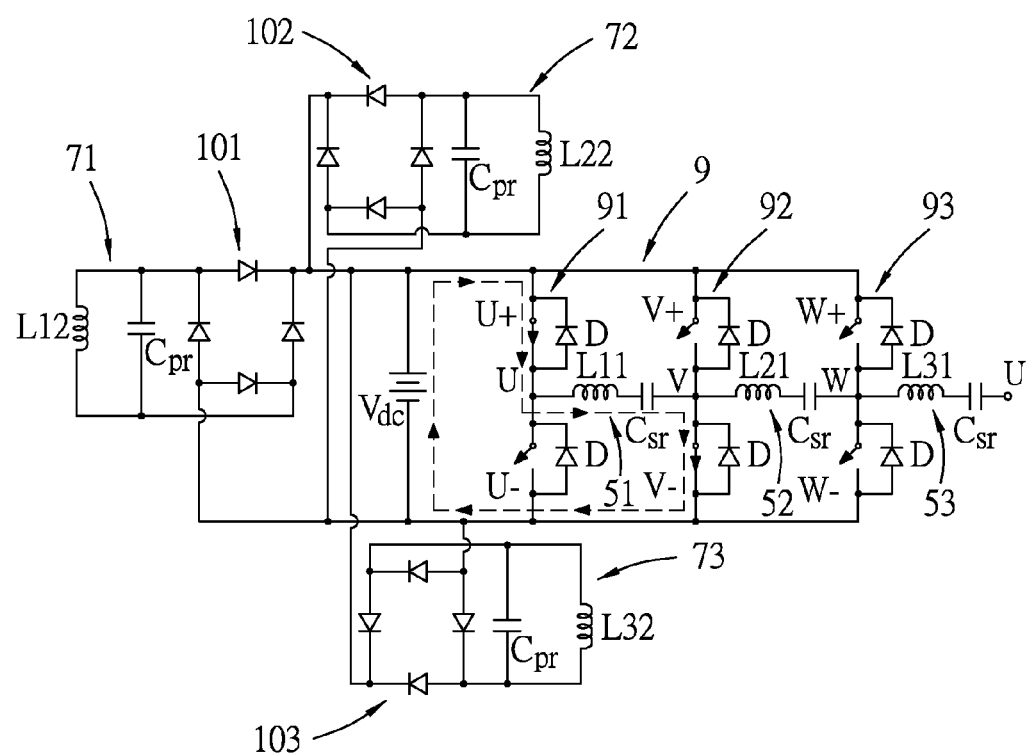
FIGS. 27 to 30 are schematic circuit diagrams illustrating operation of the fifth preferred embodiment of the magnetoelectric device.

A control signal is provided such that the series resonant circuits 51, 52, 53 take turns in forming respective circuit loops with the DC power source $V_{dc}$. Referring to FIG. 27, when the switches U+ and V− are closed and other switches are open, the DC power source $V_{dc}$ forms a circuit loop with the series resonant circuit 51 through the switches U+ and V−. If amplitude and phase of the control signal are fixed, and frequency of the control signal is adjusted to cause the series resonant circuit 51 to be at resonance, a resonance current generated by the series resonant circuit 51 is maximized, and a magnetic field thus generated magnetizes the corresponding magnetic core unit 41, such that the corresponding magnetic core unit 41 reaches magnetic saturation rapidly and becomes a magnet instantly.

Figure 28:
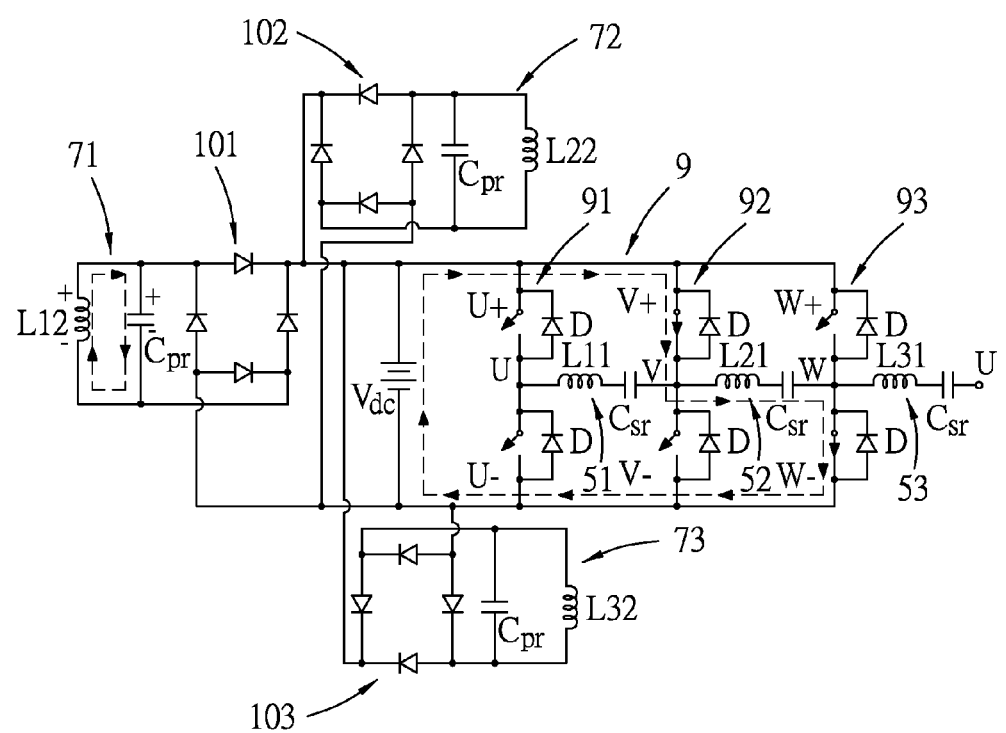

Then, as shown in FIG. 28, the switches U+ and V− are switched to be open and the switches V+ and W− are switched to be closed such that the magnetic core unit 41 corresponding to the series resonant circuit 51 is demagnetized in a very short time, and an eddy current thus generated due to magnetic shunt is coupled to the second coil L12. If the frequency of the control signal also causes the parallel resonant circuit 71 to be at resonance, the parallel resonant circuit 71 generates an AC sine-wave signal, and the full-wave rectifier circuit 101 rectifies the AC sine-wave signal thus generated into a pulsating DC signal for charging the DC power source $V_{dc}$.

At the same time, the DC power source $V_{dc}$ forms a circuit loop with the series resonant circuit 52 through the switches V+ and W−, and the series resonant circuit 52 is at resonance to output maximum resonance current due to the frequency of the control signal, such that the corresponding magnetic core unit 41 is magnetized, reaches magnetic saturation rapidly and becomes a magnet instantly.

Figure 29:
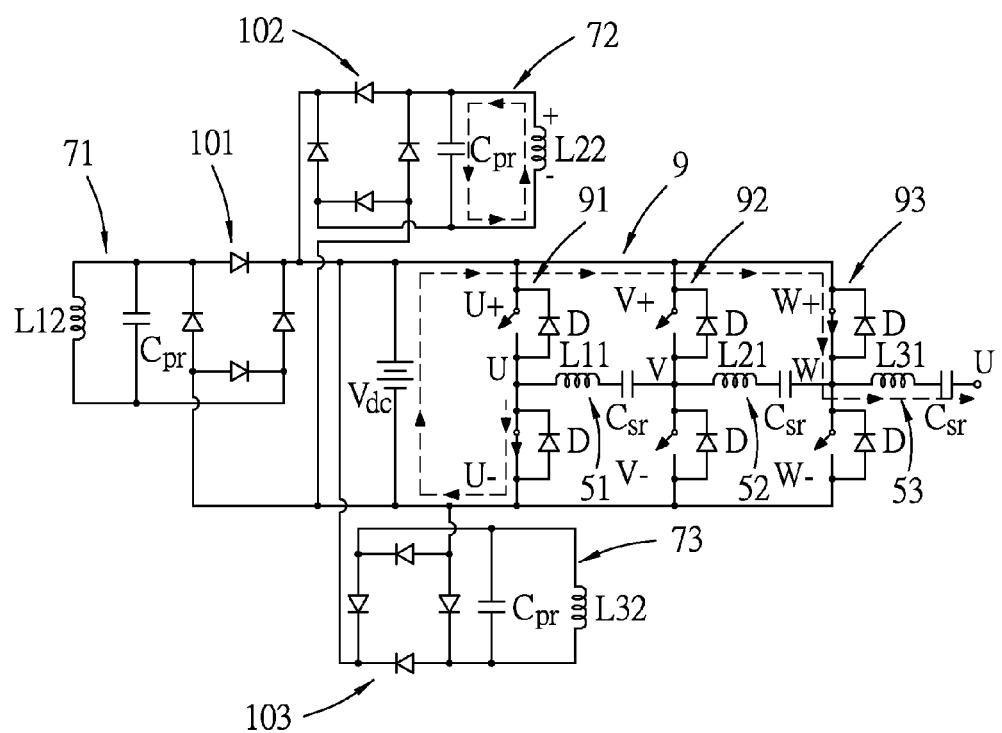

Then, as shown in FIG. 29, the switches V+ and W− are switched to be open and the switches W+ and U− are switched to be closed such that the magnetic core unit 41 corresponding to the series resonant circuit 52 is demagnetized in a very short time, and an eddy current thus generated due to magnetic shunt is coupled to the second coil L22. The frequency of the control signal causes the parallel resonant circuit 72 to be at resonance, the parallel resonant circuit 72 generates an AC sine-wave signal, and the full-wave rectifier circuit 102 rectifies the AC sine-wave signal thus generated into a pulsating DC signal for charging the DC power source $V_{dc}$.

Figure 30:
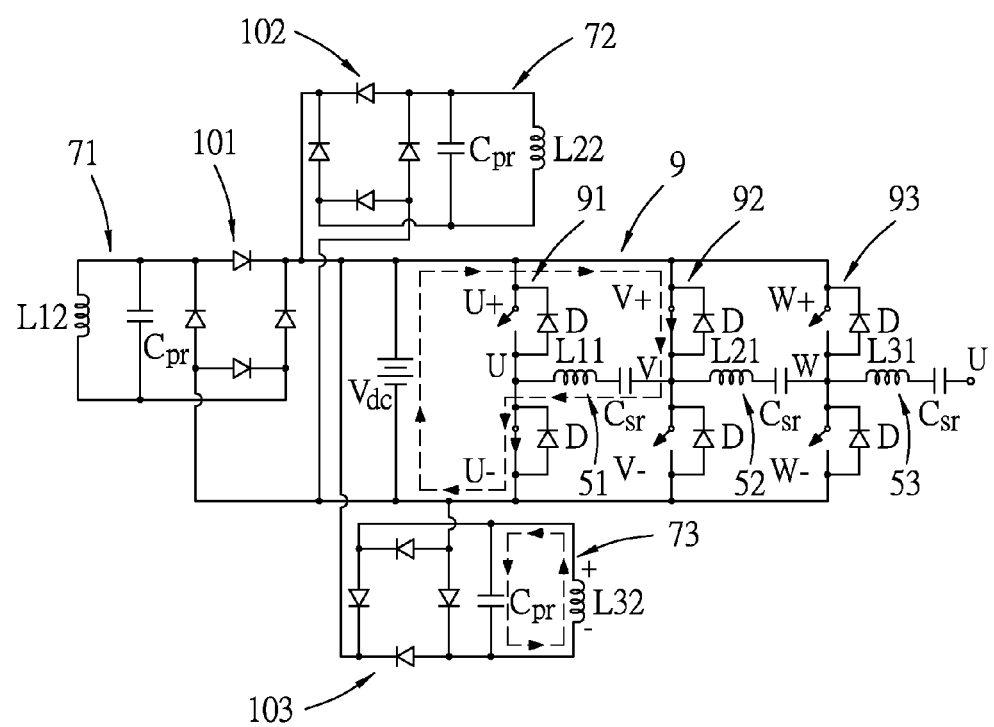

Subsequently, referring to FIG. 30, the switch W+ is switched to be open and the switch V+ is switched to be closed, the DC power source $V_{dc}$ forms a circuit loop with the series resonant circuit 51 through the switches V+ and U−, such that the magnetic core unit 41 corresponding to the series resonant circuit 51 is magnetized, the magnetic core unit 41 corresponding to the series resonant circuit 53 is demagnetized in a very short time, and an eddy current thus generated due to magnetic shunt is coupled to the second coil L32, causing the parallel resonant circuit 73 to be at resonance, and to generate an AC sine-wave signal. The full-wave rectifier circuit 103 rectifies the AC sine-wave signal thus generated into a pulsating DC signal for charging the DC power source $V_{dc}$.

Therefore, when the control signal is provided such that the series resonant circuits 51, 52, 53 take turns in forming respective circuit loops with the DC power source $V_{dc}$, the corresponding magnetic core units 41 are magnetized and demagnetized repeatedly, exciting the magnetic core units 41 to keep generation of the eddy currents that are coupled to the corresponding parallel resonant circuits 71, 72, 73, such that the parallel resonant circuits 71, 72, 73 respectively generate an AC sine-wave signal due to resonance. After rectification of the AC sine-wave signal by the full-wave rectifier circuits 101, 102, 103, the pulsating DC signals thus generated charge the DC power source $V_{dc}$, thereby promoting usable electrical energy stored in the DC power source $V_{dc}$.

To sum up, the preferred embodiments of this invention use different control signals to control the abovementioned switching circuits, making electrical connection(s) between the DC power source $V_{dc}$ and the coil(s) wound around the magnetic core unit(s) of the reluctance component to magnetize the magnetic core unit(s), and subsequently breaking electrical connection(s) between the DC power source $V_{dc}$ and the coil(s), to thereby demagnetize the magnetic core unit(s) as a result of magnetic shunt, and to generate an eddy current coupled to the coil(s) wound around the magnetic core unit(s) for charging the damping capacitor(s). Then, the damping capacitor(s) outputs current to charge the DC power source $V_{dc}$ when the voltage across the damping capacitor(s) exceeds that of the DC power source $V_{dc}$. In such a manner, magnetic energy of the magnetic core unit that has positive magnetic damping effect is converted into electrical energy for output, such that output electrical energy is increased, thus promoting usable electrical energy stored in the DC power source $V_{dc}$.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A magnetoelectric device comprising:
    at least one reluctance component that includes a magnetic core unit and at least one coil, said magnetic core unit having a loop-shaped first segment and a second segment connected to said first segment, and being made of a magnetic core material such that said magnetic core unit is both capacitive and inductive, said at least one coil being wound around and loosely coupled to said magnetic core unit;
    at least one damping capacitor coupled to and cooperating with said at least one coil to form a resonant circuit; and
    a switching circuit disposed to couple said at least one coil to a direct-current (DC) power source, and operable to make electrical connection between said at least one coil and the DC power source for exciting said at least one coil such that said magnetic core unit reaches magnetic saturation, and to subsequently break electrical connection between said at least one coil and the DC power source so as to generate an eddy current flowing through said resonant circuit for storing energy in said damping capacitor.

2. The magnetoelectric device as claimed in claim 1, wherein said first segment of said magnetic core unit is a semiconductor magnetic core that is both capacitive and inductive, and said second segment of said magnetic core unit is a permanent magnet surrounded by said first segment of said magnetic core unit and having opposite ends respectively adjacent to oppositely disposed parts of said first segment, said at least one coil including one coil wound around said first segment of said magnetic core unit.

3. The magnetoelectric device as claimed in claim 2, wherein said switching circuit includes a first switch, a second switch, a first diode, and a second diode,
    said first switch being disposed to couple a terminal of said coil to a positive terminal of the DC power source,
    said second switch being disposed to couple another terminal of said coil to a negative terminal of the DC power source,
    said first diode having a cathode coupled to said terminal of said coil, and an anode to be coupled to the negative terminal of the DC power source,
    said second diode having an anode coupled to said another terminal of said coil, and a cathode to be coupled to the positive terminal of the DC power source; and
    wherein said switching circuit is operable such that said first switch and said second switch make electrical connections simultaneously and break electrical connections simultaneously.

4. The magnetoelectric device as claimed in claim 2, wherein said semiconductor magnetic core is a solid state inductor.

5. The magnetoelectric device as claimed in claim 1, wherein said first segment of said magnetic core unit is a semiconductor magnetic core that is both capacitive and inductive, and said second segment of said magnetic core unit is a permanent magnet having one end adjacent to an outer periphery of said first segment of said magnetic core unit, said at least one coil including one coil wound around said first segment of said magnetic core unit.

6. The magnetoelectric device as claimed in claim 5, wherein said switching circuit includes a first switch, a second switch, a first diode, and a second diode,
   said first switch being disposed to couple a terminal of said coil to a positive terminal of the DC power source,
   said second switch being disposed to couple another terminal of said coil to a negative terminal of the DC power source,
   said first diode having a cathode coupled to said terminal of said coil, and an anode to be coupled to the negative terminal of the DC power source,
   said second diode having an anode coupled to said another terminal of said coil, and a cathode to be coupled to the positive terminal of the DC power source; and
   wherein said switching circuit is operable such that said first switch and said second switch make electrical connections simultaneously and break electrical connections simultaneously.

7. The magnetoelectric device as claimed in claim 5, wherein said semiconductor magnetic core is a solid state inductor.

8. The magnetoelectric device as claimed in claim 1, wherein said first segment of said magnetic core unit includes a loop-shaped inductive Mn-Zn magnetic core and a loop-shaped capacitive Ni-Zn magnetic core that are arranged in a stack, and said second segment of said magnetic core unit is a permanent magnet surrounded by said first segment of said magnetic core unit and having opposite ends respectively adjacent to oppositely disposed parts of said first segment, said at least one coil including one coil wound around said first segment of said magnetic core unit.

9. The magnetoelectric device as claimed in claim 8, wherein said switching circuit includes two bridge arms, each to be coupled to the DC power source in parallel, and each including:
   a first switch having a terminal to be coupled to a positive terminal of the DC power source;
   a second switch disposed to couple another terminal of said first switch to a negative terminal of the DC power source;
   a first freewheeling diode coupled to said first switch in parallel, and having a cathode to be coupled to the positive terminal of the DC power source; and
   a second freewheeling diode coupled to said second switch in parallel, and having an anode to be coupled to the negative terminal of the DC power source;
   wherein said coil is coupled between common nodes of said first switch and said second switch of said two bridge arms; and
   wherein said switching circuit is operable such that said first switch of one of said bridge arms and said second switch of the other one of said bridge arms both break electrical connections when said second switch of said one of said bridge arms and said first switch of the other one of said bridge arms both make electrical connections.

10. The magnetoelectric device as claimed in claim 1, wherein said second segment of said magnetic core unit is surrounded by said first segment of said magnetic core unit and extends between oppositely disposed parts of said first segment,
   wherein said magnetic core unit includes a first set of silicon steel sheets, a second set of silicon steel sheets, and an inductive amorphous magnetic core sandwiched between said first set and said second set of silicon steel sheets; and
   wherein said at least one coil includes a first coil and a second coil that are respectively wound around and loosely coupled to first and second sections of said first segment of said magnetic core unit that are disposed on opposite sides of said second segment of said magnetic core unit.

11. The magnetoelectric device as claimed in claim 10, wherein said damping capacitor and said second coil are electrically coupled in parallel, said switching circuit including:
   a first damping capacitor having a terminal to be coupled to a positive terminal of the DC power source;
   a second damping capacitor disposed to couple another terminal of said first damping capacitor to a negative terminal of the DC power source;
   a first switch having a terminal to be coupled to the positive terminal of the DC power source;
   a second switch disposed to couple another terminal of said first switch to the negative terminal of the DC power source;
   a first freewheeling diode coupled to said first switch in parallel and having a cathode to be coupled to the positive terminal of the DC power source;
   a second freewheeling diode coupled to said second switch in parallel and having an anode to be coupled to the negative terminal of the DC power source; and
   a half-wave rectifier unit disposed to couple said damping capacitor to the positive and negative terminals of the DC power source;
   wherein said first coil is coupled between a common node of said first switch and said second switch, and a common node of said first damping capacitor and said second damping capacitor; and
   wherein said switching circuit is operable such that said first switch and said second switch take turns in making electrical connections and do not make electrical connections at the same time.

12. The magnetoelectric device as claimed in claim 10, further comprising a full-wave rectifier circuit disposed to couple said damping capacitor to positive and negative terminals of the DC power source, said damping capacitor and said second coil being electrically coupled in parallel to form said resonant circuit, said switching circuit including:
   a first switch disposed to couple an end of said first coil to the positive terminal of the DC power source;
   a second switch disposed to couple another end of said first coil to the negative terminal of the DC power source;
   a first diode coupled to said first switch in parallel and having an anode coupled to said end of said first coil; and
   a second diode coupled to said second switch in parallel and having a cathode coupled to said another end of said first coil;

wherein said switching circuit is operable such that said first switch and said second switch make electrical connections simultaneously and break electrical connections simultaneously.

13. The magnetoelectric device as claimed in claim 1, comprising three of said reluctance components, and for each of said reluctance components, said second segment of said magnetic core unit is surrounded by said first segment of said magnetic core unit and extends between oppositely disposed parts of said first segment, said magnetic core unit includes a first set of silicon steel sheets, a second set of silicon steel sheets, and an inductive amorphous magnetic core sandwiched between said first set and said second set of silicon steel sheets, and said at least one coil includes a first coil and a second coil that are respectively wound around and loosely coupled to first and second sections of said first segment of said magnetic core unit that are disposed on opposite sides of said second segment of said magnetic core unit.

14. The magnetoelectric device as claimed in claim 1, comprising three of said damping capacitors and three of said reluctance components, and further comprising three resonant capacitors and three full-wave rectifier circuits;

said resonant capacitors being coupled to said first coil of a respective one of said reluctance components in series to form three series resonant circuits;

said damping capacitors being coupled to said second coil of a respective one of said reluctance components in parallel to form three parallel resonant circuits;

said full-wave rectifier circuits being disposed to couple a respective one of said parallel resonant circuits to positive and negative terminals of the DC power source;

wherein said switching circuit includes three bridge arms, each of which is to be coupled to the DC power source in parallel, and includes:

a first switch having a terminal to be coupled to the positive terminal of the DC power source;

a second switch disposed to couple another terminal of said first switch to the negative terminal of the DC power source;

a first freewheeling diode coupled to said first switch in parallel, and having an anode coupled to said another terminal of said first switch; and a second freewheeling diode coupled to said second switch in parallel, and having a cathode coupled to said another terminal of said first switch;

a first one of said series resonant circuits being coupled between a common node of said first switch and said second switch of a first one of said bridge arms, and a common node of said first switch and said second switch of a second one of said bridge arms;

a second one of said series resonant circuits being coupled between the common node of said first switch and said second switch of said second one of said bridge arms, and a common node of said first switch and said second switch of a third one of said bridge arms;

a third one of said series resonant circuits being coupled between the common node of said first switch and said second switch of said third one of said bridge arms, and the common node of said first switch and said second switch of said first one of said bridge arms;

said switching circuit being operable such that said series resonant circuits take turns in forming respective circuit loops with the DC power source.

* * * * *